United States Patent
Isaac

(10) Patent No.: US 12,269,424 B2
(45) Date of Patent: Apr. 8, 2025

(54) UNAUTHORIZED ACCESS DETECTION

(71) Applicant: Allstate Insurance Company, Northbrook, IL (US)

(72) Inventor: Emad S. Isaac, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 71 days.

(21) Appl. No.: 16/937,006

(22) Filed: Jul. 23, 2020

(65) Prior Publication Data

US 2022/0024414 A1    Jan. 27, 2022

(51) Int. Cl.
| | |
|---|---|
| *B60R 25/25* | (2013.01) |
| *B60R 25/24* | (2013.01) |
| *B60R 25/32* | (2013.01) |
| *G06N 20/00* | (2019.01) |
| *G06V 40/50* | (2022.01) |
| *B60R 25/102* | (2013.01) |
| *B60R 25/33* | (2013.01) |

(52) U.S. Cl.
CPC .......... *B60R 25/252* (2013.01); *B60R 25/241* (2013.01); *B60R 25/32* (2013.01); *G06N 20/00* (2019.01); *G06V 40/50* (2022.01); *B60R 25/102* (2013.01); *B60R 25/33* (2013.01)

(58) Field of Classification Search
CPC ....... B60R 25/00; B60R 25/04; B60R 25/045; B60R 25/10; B60R 25/102; B60R 25/24; B60R 25/241; B60R 15/25; B60R 25/30; B60R 25/25; G60K 9/00; H04L 29/00; H04L 29/06; H04L 63/00
See application file for complete search history.

(56) References Cited

U.S. PATENT DOCUMENTS

| | | |
|---|---|---|
| 8,344,849 B2 | 1/2013 | Larsson et al. |
| 8,474,569 B2 | 7/2013 | Seymour et al. |
| 8,558,678 B2 | 10/2013 | Van Wiemeersch et al. |
| 8,634,822 B2 | 1/2014 | Silver et al. |

(Continued)

FOREIGN PATENT DOCUMENTS

| | | |
|---|---|---|
| DE | 10119959 A1 | 10/2002 |
| DE | 102018008680 A1 | 5/2019 |

(Continued)

OTHER PUBLICATIONS

NPL Search (May 17, 2022).*

(Continued)

*Primary Examiner* — Van T Trieu
(74) *Attorney, Agent, or Firm* — Akerman LLP

(57) ABSTRACT

Methods, computer-readable media, software, and apparatuses include receiving sensor data from a sensor system associated with a vehicle during operation of the vehicle over a plurality of modes of operation, computing, based on the sensor data, a vehicle fingerprint comprising one or more vehicle characteristics over the plurality of modes of operation, monitoring additional received sensor data from the sensor system during further operation of the vehicle, determining whether an anomaly exists based on comparing the additional received sensor data to the vehicle fingerprint, and based upon determining that an anomaly exists, providing an alert to a communication interface associated with the vehicle.

18 Claims, 6 Drawing Sheets

(56) References Cited

U.S. PATENT DOCUMENTS

| | | | |
|---|---|---|---|
| 8,880,291 | B2 | 11/2014 | Hampiholi |
| 9,563,998 | B2 | 2/2017 | Hoyos et al. |
| 9,866,542 | B2 | 1/2018 | Baltes et al. |
| 9,988,058 | B2* | 6/2018 | Phillips .................... G07C 5/02 |
| 9,990,182 | B2 | 6/2018 | Misra et al. |
| 10,218,771 | B2 | 2/2019 | Penilla et al. |
| 2003/0182033 | A1 | 9/2003 | Underdahl et al. |
| 2010/0238009 | A1* | 9/2010 | Cook ....................... G07C 5/00 340/439 |
| 2014/0306799 | A1 | 10/2014 | Ricci |
| 2015/0061895 | A1* | 3/2015 | Ricci ..................... B60K 28/00 340/902 |
| 2015/0091713 | A1 | 4/2015 | Kohlenberg et al. |
| 2015/0298654 | A1 | 10/2015 | Joao et al. |
| 2017/0278323 | A1 | 9/2017 | Gupta et al. |
| 2019/0061687 | A1 | 2/2019 | Khalil |
| 2019/0371085 | A1 | 12/2019 | Kishikawa et al. |
| 2020/0090425 | A1* | 3/2020 | Senft-Grupp ...... G01R 31/3648 |
| 2020/0104876 | A1* | 4/2020 | Chintakindi ....... G06Q 30/0611 |
| 2020/0242421 | A1* | 7/2020 | Sobhany .............. G05B 13/028 |
| 2020/0298797 | A1* | 9/2020 | Shin .................... B60R 25/1004 |

FOREIGN PATENT DOCUMENTS

| | | |
|---|---|---|
| KR | 101439481 B1 | 9/2014 |
| TW | I488766 B | 6/2015 |

OTHER PUBLICATIONS

Abdul Wahab et al., "Driving Profile Modeling and Recognition Based on Soft Computing Approach," IEEE Transactions on Neural Networks, vol. 20, No. 4, Apr. 2009, pp. 563-582.

Siti-Farhana Lokman et al., "Intrusion detection system for automotive Controller Area Network (CAN) bus system: a review," EURASIP Journal on Wireless Communications and Networking, (2019) 2019:184; https://doi.org/10.1186/s1368-019-1484-3; pp. 1-17.

Byung Il Kwak et al., "Know Your Master: Driver Profiling-based Anti-theft Method," date Apr. 24, 2017, pp. 1-8.

International Search Report and Written Opinion of The International Searching Authority for International Application No. PCT/US2021/040259 dated Oct. 28, 2021 (12 pages).

Yijie Xun, et al., "Automobile Driver Fingerprinting: A New Machine Learning Based Authentication Scheme", IEEE Transactions on Industrial Informatics, vol. 16, No. 2, Feb. 2020, pp. 1417-1426, XP011767216.

\* cited by examiner

610

Setup Interface

No Vehicle Fingerprints Detected

Would you like to create a vehicle fingeprint?

| Yes | No |

Alert Interface

Unauthorized Vehicle Use Detected

720 Take Action

730 Review Data

740 Dismiss

FIG. 7

UNAUTHORIZED ACCESS DETECTION

FIELD OF ART

Aspects of the disclosure generally relate to methods and computer systems, including one or more computers particularly configured and/or executing computer software and one or more sensors operably connected to the one or more computers. More specifically, aspects of this disclosure relate to systems and methods for determining fraudulent or unauthorized vehicle use or other vehicle issues by using a vehicle fingerprint, vehicle patterns, and/or learned driving patterns of a user.

BACKGROUND

Detecting and preventing fraudulent or unauthorized use of a vehicle has become a priority, particularly for insurance and/or financial institutions and with the rise in vehicle sharing, ride sharing, and other gig uses associated with vehicles. For example, a vehicle user (e.g., a lessee) may be prohibited from using the vehicle for a ride sharing or gig use, but the vehicle owner or other stakeholder may have no reliable means to monitor against such usage. Without an impartial and reliable source for verifying vehicle use, vehicle owners and service providers may be susceptible to being the victims of such unauthorized uses. When such fraudulent activities are undetected and/or not mitigated, businesses may incur increased losses, including, but not limited to, an erosion of a customer base. Additionally, detection of other vehicle issues, e.g., that the vehicle needs a type of servicing or maintenance, is also important. Sensors found in user devices and vehicles may provide information pertaining to various vehicle-specific and user-specific parameters. Thus, there remains an ever-present need to detect fraudulent or unauthorized use of vehicles or other vehicle issues.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer-readable storage media, software, systems, and apparatuses for detection of fraud, unauthorized use, or other vehicle issues. In particular, based on sensed driving data associated with a vehicle, a vehicle fingerprint may be determined. Accordingly, when additional sensed driving data deviates from such vehicle fingerprint, it may be detected as a fraudulent or unauthorized activity or other vehicle issue.

In some aspects, an apparatus is implemented in a vehicle. The apparatus includes at least one sensor configured to measure a characteristic of the vehicle, at least one processor, a communication interface communicatively coupled to the at least one processor, and memory storing computer-readable instructions that, when executed by the processor, cause the apparatus to receive sensor data from the at least one sensor over a plurality of modes of operation of the vehicle, determine a vehicle fingerprint based on the received sensor data, receive additional sensor data from the at least one sensor during additional operation of the vehicle, determine whether a deviation exists based on comparing the received additional sensor data to the vehicle fingerprint, and based upon determining that a deviation exists, providing an alert to the communication interface indicating a potential unauthorized use of the vehicle or other vehicle issue.

In some aspects, the memory may store additional computer-readable instructions that, when executed by the at least one processor, further cause the apparatus to compute an updated vehicle fingerprint based on the received additional sensor data by applying a machine learning model to the vehicle fingerprint. Determining the vehicle fingerprint may include identifying sensor data associated with each of the plurality of modes of operation and determining a vehicle characteristics associated with each mode of operation. The plurality of modes of operation may include a plurality of trips and a plurality of drivers. The vehicle fingerprint may include a frequency of the vehicle at the plurality of operating conditions. The memory may store additional computer-readable instructions that, when executed by the at least one processor, further cause the apparatus to receive a user input at the communication interface indicating a dismissal of the alert, and upon receiving the dismissal of the alert, determining an updated vehicle fingerprint based on at least the received additional sensor data. In some aspects, the memory may store additional computer-readable instructions that, when executed by the at least one processor, further cause the apparatus to detect a driving pattern of the vehicle for an interval of time, and wherein determining whether a deviation exists includes comparing at least one additional aspect of the additional sensor data to the driving pattern. The memory may store additional computer-readable instructions that, when executed by the at least one processor, further cause the apparatus to determine a type of use of the vehicle associated with the received additional sensor data.

In other aspects, a method includes receiving sensor data from a sensor system associated with a vehicle during operation of the vehicle over a plurality of modes of operation, computing, based on the sensor data, a vehicle fingerprint comprising one or more vehicle characteristics over the plurality of modes of operation, monitoring additional received sensor data from the sensor system during further operation of the vehicle, determining whether an anomaly exists based on comparing the additional received sensor data to the vehicle fingerprint, and based upon determining that an anomaly exists, providing an alert to a communication interface associated with the vehicle.

Receiving sensor data during operation of the vehicle over the plurality of modes of operation may include receiving sensor data associated with a plurality of trips and a plurality of drivers. Determining the vehicle fingerprint may include identifying sensor data associated with each of the plurality of modes of operation and determining a vehicle characteristics associated with each mode of operation. In some aspects, the method may include receiving a user input at the communication interface indicating a dismissal of the alert, and upon receiving the dismissal of the alert, determining an updated vehicle fingerprint based on at least the received additional sensor data. The method may include computing an updated vehicle fingerprint based on the additional received sensor data by applying a machine learning model to the vehicle fingerprint. The method may further include detecting a driving pattern of the vehicle for an interval of time, and determining whether a deviation exists may include comparing at least one additional aspect of the additional sensor data to the driving pattern. In some aspects, the method may include determining a type of use of the vehicle associated with the received additional sensor data.

In some aspects, a system includes a first computing device associated with a vehicle and a second computing device in signal communication with the first computing device. The first computing device includes a processor, at least one sensor configured to measure a vehicle characteristic during operation of the vehicle, a wireless communication interface, and memory storing instructions that, when executed by the one or more processors, cause the first computing device to measure, using the at least one sensor, vehicle operation data. The second computing device may include a processor and memory storing instructions that, when executed by the processor, cause the second computing device to receive, from the first computing device, vehicle operation data for a plurality of modes of operation, determine a vehicle fingerprint based on the vehicle operation data, receive additional vehicle operation data from the at least one sensor during additional operation of the vehicle, determine whether a deviation exists based on comparing the received additional vehicle operation data to the vehicle fingerprint, and based upon determining that a deviation exists, trigger one or more steps to protect the vehicle.

In some aspects, the plurality of modes of operation may include a plurality of trips and a plurality of drivers. Determining the vehicle fingerprint may include identifying sensor data associated with each of the plurality of modes of operation and determining a vehicle characteristics associated with each mode of operation. The vehicle fingerprint may include a frequency of the vehicle at the plurality of operating conditions. In some aspects, the first computing device may be a mobile computing device and the second computing device may be a server.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 6 illustrates an exemplary vehicle fingerprint setup user interface in accordance with one or more aspects described herein.

FIG. 7 illustrates an exemplary vehicle fingerprint alert user interface in accordance with one or more aspects described herein.

DETAILED DESCRIPTION

In accordance with various aspects of the disclosure, methods, computer-readable media, software, and apparatuses are disclosed for determining a fraudulent or unauthorized user or other vehicle issue by using a vehicle fingerprint, vehicle patterns, and/or learned driving patterns of a user. As described herein, unauthorized access and fraud detection and/or prevention may be facilitated using a dynamically determined vehicle fingerprint.

In some instances, unauthorized use associated with a vehicle may go undetected, and valuable time may elapse before such activity may be detected, reported, and/or mitigated. As a result, perpetrators of such unauthorized uses may remain out of reach of law enforcement authorities. Also, for example, many enterprises may lack technology to determine if an unauthorized use may have occurred. As another example, enterprises may lack an ability to independently verify if an unauthorized activity may have occurred. In some instances, a business organization may have to rely on a customer's notification of unauthorized activity, and may expend time and/or resources to verify such claims. Additionally, issues associated with the operation and maintenance of a vehicle may go unnoticed for a period of time, potentially worsening the problem.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
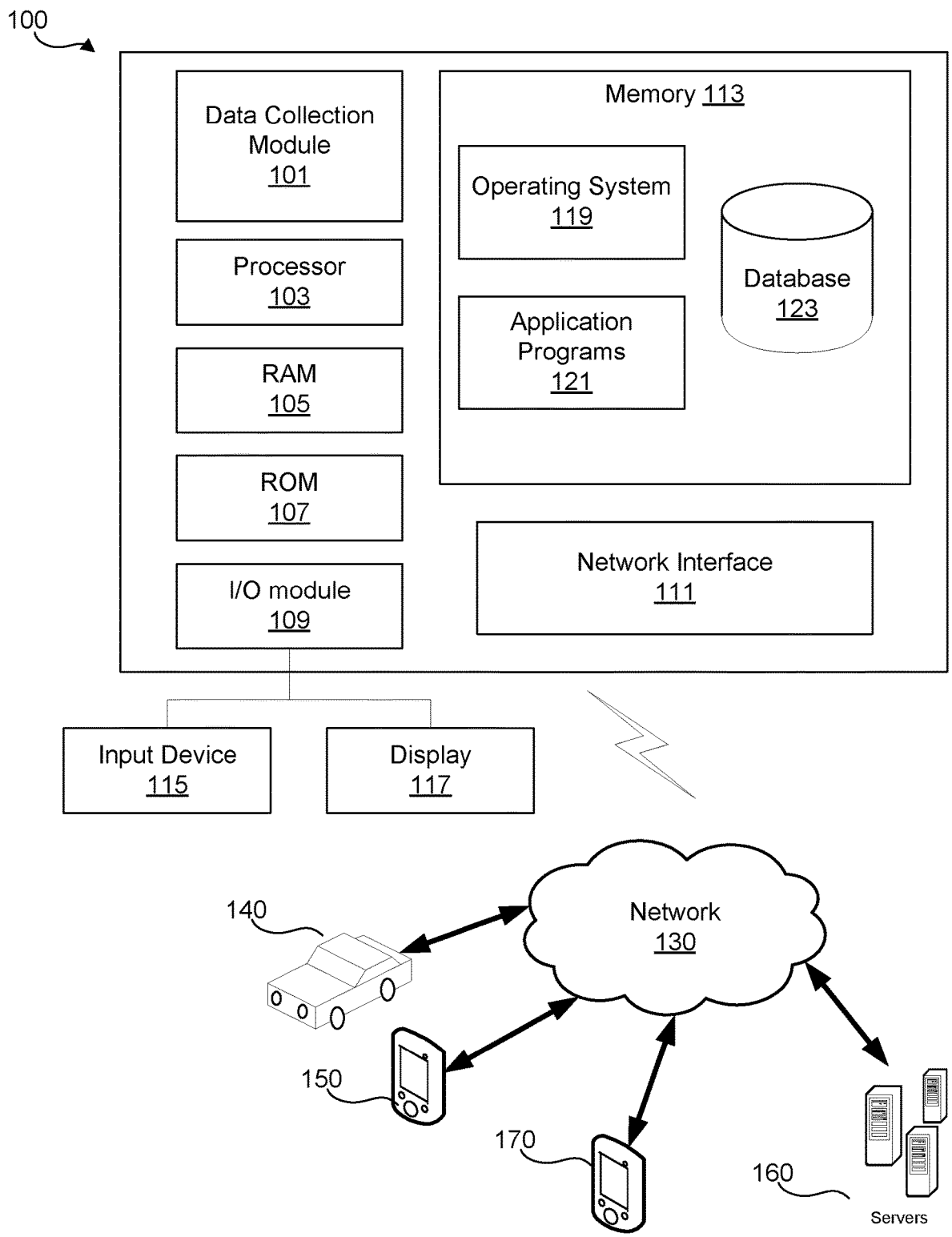
FIG. 1 illustrates an example computing environment including a vehicle fingerprint determination and analysis device that may be used in accordance with one or more aspects described herein.

In one or more arrangements, aspects of the present disclosure may be implemented with a computing device. FIG. 1 illustrates a block diagram of an example computing environment including vehicle fingerprint determination device 100 (also referred to herein as a vehicle fingerprint analysis device or a vehicle fingerprint determination and analysis device) that may be used in accordance with one or more aspects described herein. The vehicle fingerprint determination device 100 may be a computing device, such as a personal computer (e.g., a desktop computer), server, laptop computer, notebook, tablet, smartphone, etc. The vehicle fingerprint determination device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), field programmable gate arrays (FPGA), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, vehicle fingerprint determination device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the vehicle fingerprint determination device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the vehicle fingerprint determination device 100 may provide input data. The I/O module 109 may also be configured to be connected to a display device 117, such as a monitor, television, touchscreen, etc., and may include a graphics card. For example, the I/O module 109 may be configured to receive biometric data from a user. The display device 117 and input device 115 are shown as separate elements from the vehicle fingerprint determination device 100; however, they may be within the same structure. On some vehicle fingerprint determination devices 100, the input device 115 may be operated by a driver of a vehicle to interact with the data collection module 101, including providing information about vehicle information, driver preferences, driver information, account information, etc., as described in further detail below. System administrators may use the input device 115 to make updates to the data collection module 101, such as software updates Meanwhile, the display device 117 may assist the system administrators and users to confirm/appreciate their inputs.

The memory 113 may be any computer-readable medium for storing computer-executable instructions (e.g., software). The instructions stored within memory 113 may enable the vehicle fingerprint determination device 100 to perform various functions. For example, memory 113 may store software used by the vehicle fingerprint determination device 100, such as an operating system 119 and application programs 121, and may include an associated database 123.

Although not shown in FIG. 1, various elements within memory 113 or other components in the vehicle fingerprint determination device 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 160 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 160. These types of caches and others may be included in various embodiments, and may provide potential advantages in certain implementations of retrieving and analyzing driving data, such as faster response times and less dependence on network conditions when transmitting/receiving driving data from a vehicle 140 (e.g., from vehicle-based devices such as on-board vehicle computers, short-range vehicle communication systems, telematics devices), data from one or more enterprise servers 160, etc.

The network interface 111 may allow vehicle fingerprint determination device 100 to connect to and communicate with a network 130. The network 130 may be any type of network, including a local area network (LAN) and/or a wide area network (WAN), such as the Internet, a cellular network, or satellite network. Through network 130, vehicle fingerprint determination device 100 may communicate with one or more other computing devices such as a user device 150 (e.g., laptops, notebooks, smartphones, tablets, personal computers, servers, vehicles, home management devices, home security devices, smart appliances, etc.) associated with a driver of vehicle 140. Through network 130, vehicle fingerprint determination device 100 may communicate with one or more mobile computing devices 170 (e.g., devices positioned in a vehicle). Through network 130, vehicle fingerprint determination device 100 may also communicate with one or more enterprise servers 160 to exchange related information and data.

Network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 111 may use various protocols, including TCP/IP, Ethernet, File Transfer Protocol (FTP), Hypertext Transfer Protocol (HTTP), etc., to communicate with user device 150, mobile computing device 170, and enterprise servers 160.

It will be appreciated that the network connections shown are illustrative and other means of establishing a communications link between the computers may be used. The existence of any of various network protocols such as Transmission Control Protocol/Internet Protocol ("TCP/IP"), Ethernet, File Transfer Protocol ("FTP"), Hypertext Transfer Protocol ("HTTP") and the like, and of various wireless communication technologies such as the Global System for Mobile Communications ("GSM"), Code Division Multiple Access ("CDMA"), Wi-Fi, Long-Term Evolution ("LTE"), and Worldwide Interoperability for Microwave Access ("WiMAX"), is presumed, and the various computing devices and mobile device location and configuration system components described herein may be configured to communicate using any of these network protocols or technologies.

Figure 2:
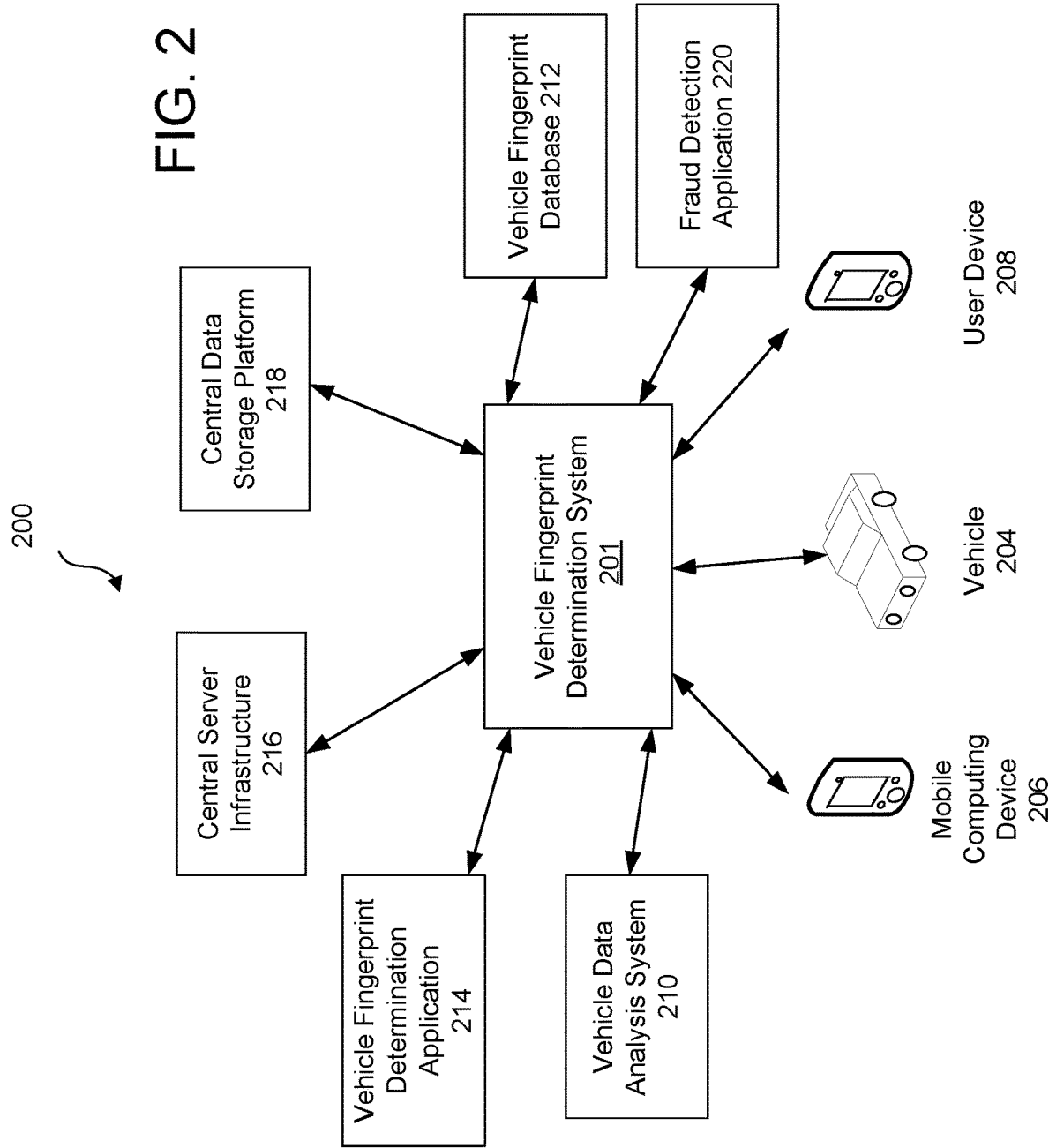
FIG. 2 illustrates a block diagram illustrating the system architecture for a vehicle fingerprint determination and analysis system in accordance with one or more aspects described herein.

FIG. 2 shows a block diagram illustrating system architecture 200 for a vehicle fingerprint determination and analysis system in accordance with one or more aspects described herein. A vehicle fingerprint determination system 201 may receive driving data from a vehicle 204 and/or a mobile computing device 206 associated with a driver and/or passenger of vehicle 204. In some instances, the vehicle fingerprint determination system 201 may be or include one or more components discussed with respect to a vehicle fingerprint determination device 100, as shown in FIG. 1. In some instances, vehicle fingerprint determination system 201 may be housed on vehicle 204 and/or mobile computing device 206 and/or other user device. The vehicle 204 and/or mobile computing device 206 may be equipped with vehicle fingerprint determination system 201 to perform the processes described herein, and may be equipped to communicate with devices, servers, databases, etc. over a network. In some embodiments, vehicle 204 and/or mobile computing device 206 may include a server and/or a network interface that facilitates communications over private and public networks. In some embodiments, vehicle fingerprint determination system 201 may collect information from and transmit information to each of the various applications, databases, devices, and backend servers described in FIG. 1.

In some embodiments, vehicle fingerprint determination system 201 may retrieve driving data from a computing device at a vehicle 204 and/or mobile computing device 206 associated with a driver and/or passenger of vehicle 204. For example, vehicle 204 may be equipped with a telematics device (e.g., an in-vehicle telematics device) that provides various telematics information to users and/or service providers regarding vehicle location, direction of travel, velocity, route, and/or destination. In some embodiments, vehicle fingerprint determination system 201 may track a driver's location, and other driving-related information through telematics information. In some embodiments, an in-vehicle telematics device may include a processor with a display or graphical interface that receives and/or collects driving data and/or telematics information and provides additional information based on the driving data. The driving data and/or telematics information may include, but not be limited to: location, instantaneous velocity, average velocity, route, destination, braking, swerving, etc. The in-vehicle telematics device, which may be configured to receive real-time vehicle data, may provide vehicle fingerprint determination system 201 with visual and/or audible in-vehicle information. In some embodiments, vehicle data may include biometric data for a driver of vehicle 204, where vehicle 204 includes one or more sensors for receiving biometric data. For example, an electro-cardiogram ("ECG") meter in a steering wheel of vehicle 204 may identify a unique ECG signature for a driver of vehicle 204, a fingerprint scanner may be used to obtain the driver's fingerprint, a microphone may be used to collect a voiceprint of the driver, a camera with facial recognition software may be used to obtain the driver's facial features or structure, and/or various other sensors may be used for collection of various other types of biometric data. The in-vehicle telematics device may process real-time and/or near real-time data and then provide the processed information in a meaningful way for display via a graphical user interface ("GUI") on the in-vehicle telematics device. The in-vehicle telematics device may receive and/or collect driving data and store summary information for and/or about the driver.

The in-vehicle telematics device may communicate with a data collection device or on-board diagnostics port of a vehicle to collect the driving data. In another exemplary embodiment, the in-vehicle telematics device may acquire the driving data directly from a device, such as mobile computing device 206 (e.g., a smart phone, tablet computer, or vehicle navigation system via a built-in accelerometer and/or a Global Positioning System ("GPS"), and so forth). Vehicle fingerprint determination system 201 may collect data from one or more additional mobile computing devices associated with the vehicle, in a similar manner as mobile computing device 206.

Vehicle fingerprint determination system 201 may analyze driving data such as data from an accelerometer, a braking device, traffic data, weather data, location data (e.g., GPS data, Wi-Fi data, and so forth) of vehicle 204 or from mobile computing devices 206 to determine a location of a vehicle, a speed, terrain, type of traffic, and so forth. For example, driving data may be indicative of driving activity that is unauthorized for vehicle 204, such as that the driving data indicates that a driver is not an authorized driver of vehicle 204, or that driving data indicates a service need or mechanical problem with vehicle 204.

The vehicle data may be analyzed by vehicle data analysis system 210. For example, vehicle data analysis system 210 may analyze location data from vehicle 204 and/or mobile computing device 206 to identify a geographical location of vehicle 204 and/or mobile computing device 206. As another example, driving data analysis system 210 may analyze data related to movement of vehicle 204 to determine speed, acceleration, frequency and duration of stops, and related parameters associated with vehicle 204.

Vehicle fingerprint determination system 201 may determine a vehicle fingerprint associated with vehicle 204 based on the analysis of the vehicle fingerprint determination application 214. For example, vehicle fingerprint determination application 214 may utilize vehicle data related to a route, origin, destination, and so forth, in conjunction with other vehicle sensor data to determine an average or expected pattern of use a vehicle over a recurring period of time. For example, there may be a frequency attributed to vehicle 204 when idling, another frequency attributed to vehicle 204 when driving at a first speed, and another frequency when vehicle 204 is driving at a second speed. By collecting the associated frequencies of vehicle 204 over a range of such operating conditions and determining a pattern at which vehicle 204 operates at such conditions, a vehicle fingerprint may be determined for vehicle 204. For, example, vehicle fingerprint determination application 214 may determine that certain vehicle data is associated with a daily driving pattern (e.g., the vehicle start the day at a home location, travels to a work destination at 9:00 AM via a typical route, leaves the work destination at 5:00 PM and returns to the home location via a typical route). In some embodiments, vehicle fingerprint determination system 201 may determine that a vehicle is currently in a parked position, and associate a low likelihood (or a zero likelihood) of an unauthorized use when the vehicle is in the parked position. As another example, vehicle fingerprint determination system 201 may determine when the vehicle starts a drive at a time that deviates from the vehicle driving pattern, and associate a medium or high likelihood of an unauthorized use when the vehicle.

In some aspects, vehicle fingerprint associated with vehicle 204 may be stored with a plurality of other vehicle fingerprints in vehicle fingerprint database 212. Also, for example, vehicle fingerprint database 212 may include additional information tied to each vehicle fingerprint, including one or more of: make and model of the vehicle, vehicle owner information, permitted drivers of the vehicle, insurance information, permitted uses for the vehicle, and the like. Also, vehicle fingerprint database 212 may be configured to receive an updated fingerprint for a vehicle based on ongoing data collection and analysis associated with that vehicle.

Central server infrastructure 216 may be configured to host, execute, manage, and/or otherwise provide a computing platform for various computing devices and/or enterprise applications. In some instances, central server infrastructure 216 may be configured to provide various enterprise and/or back-office computing functions for an enterprise organization, such as an insurance organization, a financial institution, and so forth. For example, central server infrastructure 216 may include various servers that host applications that maintain, support, process, and/or provide account information associated with a user, such as driving history, driving patters, biometric data, financial account information including type of insurance, policy coverage, account balances, transaction history, online activities and other account access data, and/or other information. Additionally, or alternatively, central server infrastructure 216 may receive instructions from vehicle fingerprint determination system 201 and execute the instructions in a timely manner.

Central data storage platform 218 may be configured to store and/or otherwise maintain data, including account information associated with a user, such as driving data received from a vehicle and/or a user computing device, IP address data, driving history, driving patterns, biometric data, insurance data (e.g., policy coverage, account balances, transaction history, etc.), online activities and other account access data, and/or data otherwise provided by central server infrastructure 216. Also, for example, central data storage platform 218 may be configured to store and/or otherwise maintain information associated with determined vehicle fingerprints, driving characteristics, and driving patterns. For example, central data storage platform 218 may be configured to store and/or otherwise maintain a list of driving patterns and driving characteristics associated with the operation for vehicles. As another example, central data storage platform 218 may be configured to store and/or otherwise maintain geolocation profiles for vehicles. Additionally, or alternatively, central server infrastructure 216 may load data from central data storage platform 218, manipulate and/or otherwise process such data, and return modified data and/or other data to central data storage platform 218.

Fraud detection application 220 may work in conjunction with vehicle data analysis system 210, vehicle fingerprint database 212, vehicle fingerprint determination application 214 to compare incoming, new vehicle data to an associated vehicle fingerprint. If a deviation or anomaly relative to the vehicle fingerprint is detected, fraud detection application 220 may determine an unauthorized or fraudulent use of the vehicle or another issues associated with the vehicle, as described in more detail below.

Although vehicle data analysis system 210, vehicle fingerprint database 212, vehicle fingerprint determination application 214, central server infrastructure 216, central data storage platform 218, and fraud detection application 220 are shown as separate elements from vehicle fingerprint determination system 201, one or more of them may be within the same structure in accordance with aspects of the present disclosure.

Figure 3:
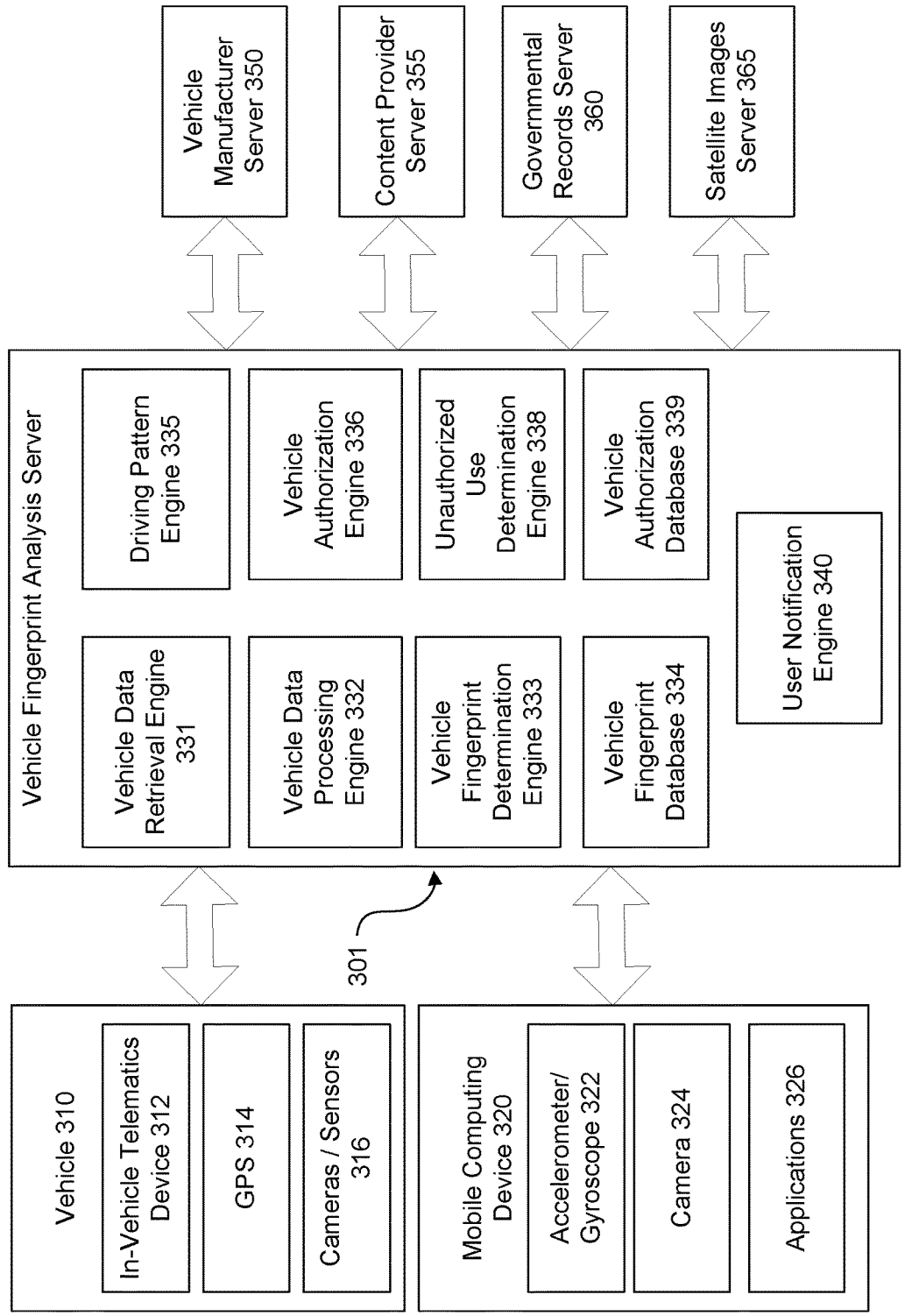
FIG. 3 illustrates a block diagram of a vehicle fingerprint determination and analysis system that collects information from various sources to determine a vehicle fingerprint and detect a potential unauthorized use or other vehicle issue based on a deviation from the vehicle fingerprint with one or more aspects described herein.

FIG. 3 illustrates a block diagram of a vehicle fingerprint determination and analysis system that collects information from one or more data sources to determine a signature of a vehicle. Such data sources may include one or more of a vehicle 310 and a mobile computing device 320 associated with the vehicle. While FIG. 3 illustrates one mobile computing device 320, in other examples a plurality of mobile computing devices, or no mobile computing devices may be included without departing from the scope of the present disclosure. As shown in FIG. 3, the vehicle fingerprint analysis server 301 may communicate with vehicle 310 and/or mobile computing device 320 to collect driving data associated with vehicle 310.

As shown in FIG. 3, vehicle fingerprint determination system includes a vehicle 310, such as an automobile, motorcycle, recreational vehicle, boat, or other vehicle. The conditions of various features of the vehicle may be measured via sensors on mobile computing device 320 and/or vehicle 310. The vehicle 310 may include vehicle operation sensors 316 capable of detecting and recording various conditions at the vehicle and operational parameters of the vehicle. For example, sensors 316 may detect and store data corresponding to the vehicle's speed, distances driven, rates of acceleration or braking, and specific instances of sudden acceleration, braking, and/or swerving. Sensors 316 may also detect and store data received from the vehicle's internal systems, such as impact to the body of the vehicle, air bag deployment, headlights usage, brake light operation, vehicle drift, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. In some instances, the data obtained from these sensors or electronic system(s) may be used as a reference with which to compare submissions by the user regarding a vehicle's conditions or with which to compare the ingoing received data.

Additional sensors 316 may detect and store the vehicle's external features and driving conditions, for example, the vehicle's front, side, and rear body exterior, the vehicle's windshield conditions, the vehicle's wiper conditions, external temperature, rain, snow, light levels, and sun position for driver visibility. Sensors 316 may also detect and store data relating to moving violations and the observance of traffic signals and signs by the vehicle 310. Additional sensors 316 may detect and store data relating to the vehicle's mechanical features and that provide further indications of maintenance of the vehicle 310. The data gathered from these sensors may include, for example, the engine status, oil level, engine coolant temperature, odometer reading, the level of fuel in the fuel tank, engine revolutions per minute (RPMs), and/or tire pressure.

The vehicle 310 also may include one or more cameras and proximity sensors 316 capable of recording additional conditions inside or outside of the vehicle 310. Internal cameras 316 may detect conditions such as the number of the passengers that typically ride the vehicle 310, and conditions of the interior features of the vehicle (e.g., habitability, dashboard wear, seat wear). External cameras and proximity sensors 316 may detect other nearby vehicles, traffic levels, road conditions, traffic obstructions, animals, cyclists, pedestrians, and other conditions that may factor into a user's driving history and other user-specific information relevant for the generation of vehicle service contracts. In some examples, sensors 316 may include custom-built sensors in the vehicle specifically implemented for the uses described herein.

Sensors 316 may store data within the vehicle 310, and/or may transmit the data to one or more external computer systems (e.g., a computer system or server of the vehicle dealer or vehicle manufacturer 350 and/or the vehicle fingerprint analysis server 301). As shown in FIG. 3, the sensors 316 may be configured to transmit data to vehicle manufacturer server 350 via a telematics device 312. In other examples, sensors 316 may be configured to transmit data directly without using a telematics device 312. For example, telematics device 312 may be configured to receive and transmit data from sensors 316, and sensors 316 may be configured to directly transmit data to a vehicle manufacturer server 350 or the vehicle fingerprint analysis server 301 without using the telematics device 312. Thus, telematics device 312 may be optional in certain embodiments where sensors 316 within the vehicle 310 may be configured to independently capture, store, and transmit vehicle conditions and driving data to identify potential fraud, unauthorized use, or other vehicle issues.

Telematics device 312 may receive data pertaining to a vehicle's conditions from vehicle operation sensors 316, and may transmit the data to one or more external computer systems (e.g., vehicle fingerprint analysis server 301) over a wireless transmission network. Telematics device 312 also may be configured to detect or determine additional types of data relating to real-time driving and the condition of the vehicle 310. In certain embodiments, the telematics device 312 may contain or may be integral with one or more of the vehicle operation sensors 316 discussed above, and/or with one or more additional sensors discussed below.

The telematics device 312 also may collect information regarding the vehicle's location, driver's route choice, whether the driver follows a given route, and to classify the type of trip (e.g. commute, errand, new route, gig drive etc.) via a global positioning system (GPS) 314. Information regarding routes traversed by the vehicle (e.g., gained from sensors in GPS 314) may be used, in some examples, to validate or invalidate other vehicle data, e.g., data obtained from sensors 316. Furthermore, the information regarding routes may explain why the conditions for one or more vehicle features are the way they are. Thus, information supplied by GPS 314 may be useful to assess vehicle data, e.g., whether a detected deviation from a vehicle fingerprint is also associated with a geo-location of the vehicle differing from a driving pattern.

Telematics device 312 may include various hardware/software components associated with a computing device, such as those described and depicted in FIG. 1. The telematics device 312 also may store vehicle-specific information, for example, the make, model, trim (or sub-model), year, and/or engine specifications. The vehicle type may be programmed into the telematics device 312 by a user or customer, determined by accessing a remote computer system, such as vehicle manufacturer server 350, or may be determined from the vehicle itself (e.g., by accessing the vehicle's computer systems).

The server or computing system of the vehicle manufacturer or dealer (vehicle manufacturer server 350) may be a computing device separate from (e.g., located remotely from) the vehicle 310, containing various computing device hardware/software components, such as those described and depicted in FIG. 1. In some embodiments, the vehicle manufacturer server 350 may store a database including various types of vehicles manufactured and/or sold by the vehicle manufacturer. For each vehicle, the vehicle manufacturer dealer may also store vehicle specific description and multimedia content (e.g., images, videos, etc.) describing the vehicle. The vehicle manufacturer server 350 may be configured to receive and store the vehicle conditions data discussed above from vehicle 310, and similar vehicle conditions data from one or more other vehicles (not pictured in FIG. 3). In one embodiment, the vehicle manufacturer server 350 may be a vehicle operations computer system or server that act as a management system for vehicles having telematics devices. In some examples, the vehicle manufacturer server 350 includes a vehicle database that stores vehicle-specific information as reference data for vehicle fingerprint analysis server 301 to use. Data stored in the vehicle database may be organized in any of several different manners. For example, a table in the vehicle database may contain data identifying the specific vehicle (e.g., make, model, year of manufacturer, color, type, class, etc.). The table may list descriptions of various vehicle features accompanied with multimedia content. The vehicle manufacturer server 350 may also include a transactions database, which may or may not be separate from the vehicle database. The transactions database may store a record of various transactions (e.g., maintenance checks, repairs, sale, etc.) pertaining to an identified vehicle from the vehicle database. Together, vehicle database and transactions database may serve as a repository for reference data that may be requested by fraud detection server, according to methods described herein.

Mobile computing device 320 may be a computing device separate from (e.g., located remotely from) the vehicle 310 and the vehicle fingerprint analysis server 301. Mobile computing device 320 (alternatively referred to as "mobile device," "user computing device," or "user device") may include a mobile phone (e.g., smartphone), personal computer, tablet computer, laptop, or the like, which may include at least some of the features described herein. The mobile computing device 320 may be configured to receive and store the vehicle conditions data discussed above from vehicle 310, and similar vehicle conditions data from one or more other vehicles. Furthermore, the mobile computing device 320 may be able to form wired and/or wireless data connections with other computing systems and devices, such as the vehicle fingerprint analysis server 301, described further below, via the Internet or a telecommunications network. The mobile computing device 320 may include various sensors configured to collect and transmit data related to conditions of various vehicle features. For example, the mobile computing device 320 may include an in-built or accessible camera 324 that may generate image, sound, and/or video data. These data may evidence, for example, the current condition of an engine (e.g., by its sound), or the wearing down of a car seat, or collision induced damage to a car's exterior. In methods described further below, this data pertaining to the vehicle's condition may be used as reference data to confirm various other types of vehicle data received. Other sensors within the user device may include a gyroscope or accelerometer 322 to measure acceleration and/or rotation of the vehicle. Other types of sensors may also be downloaded as applications 326. The mobile computing device 320 may also store user-specific identifying information, e.g., as part of a user profile, which can be accessed by vehicle fingerprint analysis server 301. The user profile may be used by the vehicle fingerprint analysis server 301 to gain further user-specific information from other external sources (e.g., servers of various online content providers (e.g., content provider servers 355) that may host applications 326 on the mobile computing device 320, governmental records server 360, etc.). The mobile computing device 320 may also run programs or applications 326 on a user interface. One application or program may enable a user to use the systems and methods described herein to submit entries for various user-specific or vehicle-specific parameters. These entered submissions may be used, for example, to verify a user identification of a driver of the vehicle. The systems described herein may also be able to use data gathered from various sensors to confirm the veracity of the detected anomalies, e.g., perform a fraud detection assessment. The application or program may be provided to the user device or hosted by a management system, e.g., via an applications interface.

Vehicle fingerprint analysis server 301 may contain some or all of the hardware/software components described and depicted in FIG. 1. The vehicle fingerprint analysis server 301 may include hardware, software, and network components to receive submissions from the user via mobile computing device 320 or other user computing device for data field entries of one or more user-specific or vehicle-specific parameters. The data field entries may be for data fields of a standard form, e.g., a vehicle service contract, or a claims submission for a vehicle service contract where information provided in a claim submission may be checked against vehicle data associated with the claim. For example, a user may submit a claim for an occurrence in which vehicle fingerprint analysis server 301 detected unauthorized use, such as a ride sharing use, which is not authorized by the policy. In such an example, vehicle fingerprint analysis server 301 may facilitate in the processing of such claims.

The vehicle fingerprint analysis server 301 may have networking capabilities to establish connections with various sensors and external systems to gather reference data to assess the veracity of the user submissions and other received data. For example, vehicle fingerprint analysis server 301 may include hardware, software, and network components to receive vehicle conditions data from vehicle 310, vehicle-specific identification information from the vehicle manufacturer server 350 and/or directly from vehicle 310 and/or a plurality of other vehicles, user-specific identification information from the mobile computing device 320 or content provider servers 355, image data of the vehicle from mobile computing device 320 (e.g., after prompting the mobile computing device 320 to generate an image of at least a part of the vehicle 310) and/or from satellite images from a satellite images server 365, and etc. The vehicle fingerprint analysis server 301 and the mobile computing device 320 may be implemented as a single server/system, or may be separate servers/systems. In one embodiment, vehicle fingerprint analysis server 301 may be a component or application of vehicle 310 or mobile computing device 320. In another embodiment, fraud detection server may be a component or application of vehicle manufacturer server 350. In some examples, the vehicle fingerprint analysis server 301 may be a central server configured to receive vehicle conditions data from a plurality of remotely located vehicles and/or vehicle computer systems.

In some embodiments, the vehicle fingerprint analysis server 301 may comprise a vehicle data retrieval engine 331, vehicle data processing engine 332, vehicle authorization engine 336, vehicle fingerprint determination engine 333, unauthorized use determination engine 338, vehicle fingerprint database 334, vehicle authorization database 339, driving pattern engine 335, and user notification engine 340.

The vehicle data retrieval engine 331 may be configured to retrieve a vehicle data, such as, for example, a vehicle's telematics information, such as location, velocity, direction of travel, route, and destination, from vehicle 310 and/or from mobile computing devices 320. The vehicle data retrieval engine 331 may be in communication with the in-vehicle telematics device 312 and/or the mobile computing device 320, wherein the in-vehicle telematics device 312 and/or mobile computing device 320 sends the telematics information directly to the vehicle data retrieval engine 331.

The vehicle data processing engine 332 may evaluate and analyze vehicle data such as telematics information retrieved from the vehicle data retrieval engine 331. In some embodiments, vehicle data processing engine 332 may include a telematics module that may be further configured to analyze the telematics information. The vehicle data processing engine 332 may further calculate and provide information regarding distance traveled from an origin, time to travel to a destination, route information, speed along a route, frequency and duration of stops on the route, number of turns on the route etc. Through various vehicle information processed by the vehicle data processing engine 332, vehicle fingerprint determination engine 333 may determine a vehicle fingerprint associated with the vehicle 310. The vehicle data processing engine 332 and/or the vehicle fingerprint determination engine 333 may know that a user may be driving a vehicle equipped with in-vehicle telematics device 312 and/or mobile computing device 320 on his/her way home from work or through one of his/her known routes. The vehicle fingerprint determination engine 333 may determine one or more fingerprints associated with the vehicle based on known and tracked routes of the vehicle based on the retrieved data.

The various components of vehicle fingerprint analysis server 301 may be implemented in hardware and/or software configured to perform a set of specific functions within the vehicle fingerprint analysis server 301. For example, vehicle authorization engine 336 may facilitate the entry of information, e.g., by mobile computing device 320, into data fields in a form database, and the automatic generation of entries in dependent data fields based on the user's entered information. The vehicle authorization engine 336 may include one or more marks or score calculation algorithms based on a comparison of the user-generated data field entries or other collected vehicle information with reference user vehicle-specific data obtained from the vehicle authorization database 339. Calculations may be executed by one or more software applications running on generic or specialized hardware within the vehicle fingerprint analysis server 301. For example, vehicle authorization engine 336 may use data received from vehicle sensors 316 and/or mobile computing device 320 and compare these to the information obtained from the vehicle authorization database 339 to determine whether the received data indicates a potential unauthorized use via the unauthorized use determination engine 338. In some embodiments, vehicle authorization database 339 may regularly synchronize and/or update the latest vehicle-specific information on known vehicles by communicating with vehicle manufacturer server 350, and other databases and computer/systems (e.g., governmental records server 360). Further descriptions and examples of the algorithms, functions, and analyses that may be executed by the vehicle fingerprint analysis server 301 are described below in reference to FIG. 4.

As shown in FIG. 3, vehicle fingerprint analysis server 301 may include one or more databases, such as a vehicle fingerprint database 334 and a vehicle authorization database 339 to store information related to the detection of a potential fraudulent of unauthorized use of vehicle 310. As discussed below, the vehicle fingerprint analysis server 301 may retrieve and use reference data of vehicle-specific parameters from databases, such as vehicle fingerprint database 334 and vehicle authorization database 339 to assess the likelihood of fraud or unauthorized use pertaining to retrieved vehicle-specific data.

To determine the veracity of a vehicle use, the unauthorized use determination engine 338 may rely on the identification obtained via the vehicle authorization engine 336 in conjunction with retrieved vehicle data obtained, e.g., from sensors 316 of vehicle 310. Thus, vehicle data retrieval engine 331 may initiate communication with and/or retrieve data from one or more vehicle(s) 310 and/or mobile computing device(s) 240, pertaining to vehicle-specific parameters. Additionally, one or more vehicle manufacturer server 350 may store information identifying a vehicle or describing the original condition of a vehicle. Governmental records server 360 and/or satellite images server 365 may store image and video data recorded by traffic cameras at various specific locations and times, or provide user-specific driving history, collision history, criminal records, etc. These reference data can be used in combination with retrieved vehicle data to assess whether a particular vehicle use was authorized. Furthermore, vehicle authorization engine 336 and/or a user profile stored in mobile computing device 320 may be used to obtain more information about authorized uses of the vehicle, e.g., a vehicle's daily or weekly driving pattern using driving pattern engine 335, which could reveal whether newly retrieved data represents a deviation or anomaly from the driving pattern.

Vehicle authorization engine 336 may identify one or more authorized uses and/or one or more unauthorized uses for an account associated with a vehicle or with a driver. For example, vehicle authorization engine 336 may be configured to analyze one or more accounts associated with the vehicle or the driver. The account associated with the vehicle and/or driver may include information such as a list of authorized drivers, a list of authorized uses of the vehicle, a list of prohibited uses of the vehicle, unauthorized driving locations or driving times associated with the vehicle, vehicle driving restrictions, a service record of the vehicle, and so forth. In some embodiments, vehicle authorization engine 336 may be configured to retrieve a list of authorized drivers for the vehicle, and vehicle fingerprint database 334 may provide a vehicle fingerprint for each driver of the list of authorized drivers. In some embodiments, vehicle authorization engine 336 may be configured to retrieve a list of unauthorized uses of the vehicle, and vehicle data processing engine 332 may detect of a particular use of the vehicle based on received data and based on comparison to the vehicle fingerprint. In some embodiments, vehicle authorization engine 336 may be configured to retrieve service/maintenance records of the vehicle, and vehicle data processing engine 332 may detect a particular service need of the vehicle based on received data and based on comparison to the vehicle fingerprint.

Also, for example, in some embodiments, vehicle data may include biometric data for a driver of the vehicle. For example, an electro-cardiogram meter ("ECG meter") in a steering wheel of the vehicle may identify a unique ECG signature for a driver of the vehicle. Such unique signature may further confirm aspects of the driver of the vehicle, and allow unauthorized use determination engine 338 to analyze vehicle data as well as driver data to determine a potential unauthorized use of the vehicle. Similar determinations may be made based on biometric data such as breathing data, retinal scanning data, fingerprint data, voice data, and so forth.

In some embodiments, unauthorized use determination engine 338 may analyze data from the ECG and/or fingerprint sensors on the steering wheel of the vehicle to determine aspects of the driver, such as a driver identity, that the driver has both hands on the steering wheel, whether driver is impaired, or another physical issue associated with the driver. Accordingly, unauthorized use determination engine 338 may infer that aspects related to driver data indicate an unauthorized use of the vehicle. Also, for example, voice recognition software may analyze ambient noise to determine aspects of the driver of the vehicle to make other similar types of determinations. Accordingly, unauthorized use determination engine 338 may infer that certain driver data indicates an unauthorized or fraudulent use of the vehicle.

In some embodiments, user identification data from mobile computing device 320 may indicate an identification of a driver or a passenger of the vehicle. Unauthorized use determination engine 338 may determine an unauthorized use of the vehicle based on a consideration of such user identification data. For example, identification of a certain driver may indicate that driver is not authorized to have passengers in the vehicle. For another example, unauthorized use determination engine 338 may use user identification data of a driver to verify that a specific vehicle fingerprint is being employed to analyze vehicle data. Still in other examples, user identification data associated with a passenger, in combination with vehicle data may indicate that an unauthorized use of the vehicle, such as for a ride sharing application.

In some embodiments, one or more factors such as vehicle driving data, location data, biometric data, user identification data and so forth, may be combined to determine an aggregate vehicle fingerprint score that can determine a potential unauthorized use or other vehicle issues to a greater degree of certainty. For example, each additional component may provide additional information to verify whether a particular use of the vehicle is or is not authorized. For example, user identification data of a mobile computing device in the vehicle may indicate that the driver of a vehicle is an authorized driver. The biometric data associated with the driver of the vehicle may further confirm the identification of the driver and that the driver is authorized. The vehicle driving data may then be compared to a verified vehicle fingerprint of that vehicle, e.g., that is specific to the identified driver. Accordingly, the certainty associated with a determined authorized (or unauthorized) use of the vehicle or other detected vehicle issue may be increased.

In some instances, data provided in addition to the vehicle data may further clarify the type of use or other issue associated with the vehicle. For example, after determining a deviation from the vehicle fingerprint indicating a potential unauthorized use, biometric data associated with the driver may be used to determine an identification of the driver and/or other parameter to indicate a status of the driver, such as the driver being impaired or under the influence. Also, for example, vehicle data may indicate a variation from the previously determined vehicle fingerprint, and user identification data obtained from one or more mobile computing devices within the vehicle may be used to determine if the vehicle is being used for a ride sharing application. Accordingly, the data provided in addition to vehicle sensor data may improve the accuracy or further clarify the type of detected unauthorized use of the vehicle. Additionally, and/or alternatively, one or more weights may be assigned to various data to determine an aggregated vehicle fingerprint score.

In some embodiments, the sensitivity for detecting an unauthorized use may be modifiable and, in some examples, may be associated with a type of vehicle. For example, a type of vehicle having a high risk of theft may be associated with a "high" sensitivity for detecting an unauthorized use, and accordingly even minor deviations from the vehicle fingerprint may result in an unauthorized use alert. Also, for example, a vehicle may be regularly used by a plurality of different drivers, and thus be associated with a more varied vehicle fingerprint, and accordingly less sensitive to detecting an unauthorized use based on detected vehicle data. As another example, an autonomous vehicle may be associated with a vehicle fingerprint having little variation, and accordingly may be set to detect an unauthorized use with more sensitivity.

Vehicle fingerprint determination engine 333 may be configured to associate, with the determined vehicle fingerprint, a confidence level indicative of a strength of a determined vehicle fingerprint. Generally, a higher confidence level is indicative of a greater degree of certainty that a certain pattern corresponds to a determined vehicle fingerprint. On the other hand, a lower confidence level is indicative of a lower degree of certainty that a certain pattern corresponds to a determined vehicle fingerprint.

In some embodiments, the confidence level may be based on the amount or type of vehicle data. For example, vehicle fingerprint determination engine 333 may analyze vehicle data over a range of many operating conditions and for several different drivers to determine a vehicle fingerprint with a higher confidence level. Accordingly, such a vehicle fingerprint or aggregate set of vehicle fingerprints may more accurately capture the vehicle behavior for any given driving operation. In another example, vehicle fingerprint determination engine 333 may analyze vehicle data over a more limited range of operating conditions and for only a single driver to determine a vehicle fingerprint with a lower confidence level. Still in other examples, a confidence level associated with a vehicle fingerprint may be based on the reliability and repeatability of the vehicle data that is used for determining the vehicle fingerprint. Based on a confidence level attributed to a vehicle fingerprint, unauthorized use determination engine 338 may be configured to identify an unauthorized use with varying sensitivity depending on a confidence level of the vehicle fingerprint, as described below.

In some embodiments, unauthorized use determination engine 338 may identify a potentially unauthorized activity based in part on a confidence level associated with the vehicle fingerprint. For example, unauthorized use determination engine 338 may determine that a potentially unauthorized vehicle use has occurred when a deviation from the vehicle fingerprint exceeds a threshold, where the threshold may vary based on the confidence level of the vehicle fingerprint. Likewise, unauthorized use determination engine 338 may determine that a potentially unauthorized use has not occurred were the deviation from the vehicle fingerprint is within a threshold. Also, for example, unauthorized use determination engine 338 may determine that a potentially unauthorized use has occurred where a confidence level associated with the vehicle fingerprint is "High." Likewise, unauthorized use determination engine 338 may determine that a potentially unauthorized activity has not occurred where a confidence level associated with the vehicle fingerprint is "Low."

In some embodiments, data provided in addition to the vehicle data that is compared to the vehicle fingerprint may cause unauthorized use determination engine 338 to infer that a potentially unauthorized vehicle use is an actual unauthorized vehicle use. For example, when a deviation from the vehicle fingerprint is detected, received biometric data of the driver may be used to determine an additional aspect, e.g., regarding identification of the driver, whether the driver is impaired, whether the driver has both hand on the steering wheel, and the like. On the other hand, in some examples, unauthorized use determination engine 338 may automatically classify a detected deviation from the vehicle fingerprint as an unauthorized vehicle use. For example, unauthorized use determination engine 338 may make a determination that the vehicle data is indicative of an unauthorized use without analysis of further data, e.g., if a deviation from the vehicle fingerprint exceeds a threshold by a certain amount or where a confidence level associated with the vehicle fingerprint is "High." Accordingly, unauthorized use determination engine 338 may automatically classify the deviation as an unauthorized use.

User notification engine 340 may trigger one or more steps to protect the vehicle from a detected unauthorized use. For example, upon identifying an unauthorized use, unauthorized use determination engine 338 may communicate this to user notification engine 340, which may then trigger the one or more steps. For example, if certain vehicle data triggers the detection of a potential unauthorized use of the vehicle, then user notification engine 340 may transmit an alert to an account holder of the vehicle. As another example, user notification engine 340 may transmit a command to the vehicle to prevent the vehicle from being restarted until an account holder verification instruction is received.

Unauthorized use determination engine 338 may detect potential unauthorized use associated with the customer's account during a specific range of time. Accordingly, user notification engine 340 may send an electronic communication (e.g., automated voice call, an electronic mail communication, a text message, and so forth). For example, the detected unauthorized use may detect a customer's 16-year old son as a driver of a vehicle associated with the customer. Accordingly, user notification engine 340 may send an alert to the customer indicating that the system has detected that the customer's son is driving the vehicle during the specific range of time. In some examples, user notification engine 340 may send an alert to the customer that requests authorization from the customer for the customer's son to drive the vehicle. As another example, a detected potential unauthorized use may comprise a deviation from the detected driving pattern of the vehicle, and user notification engine 340 may send an alert to the customer indicating that the system has detected that a deviation from a vehicle fingerprint during the specific range of time.

Figure 4:
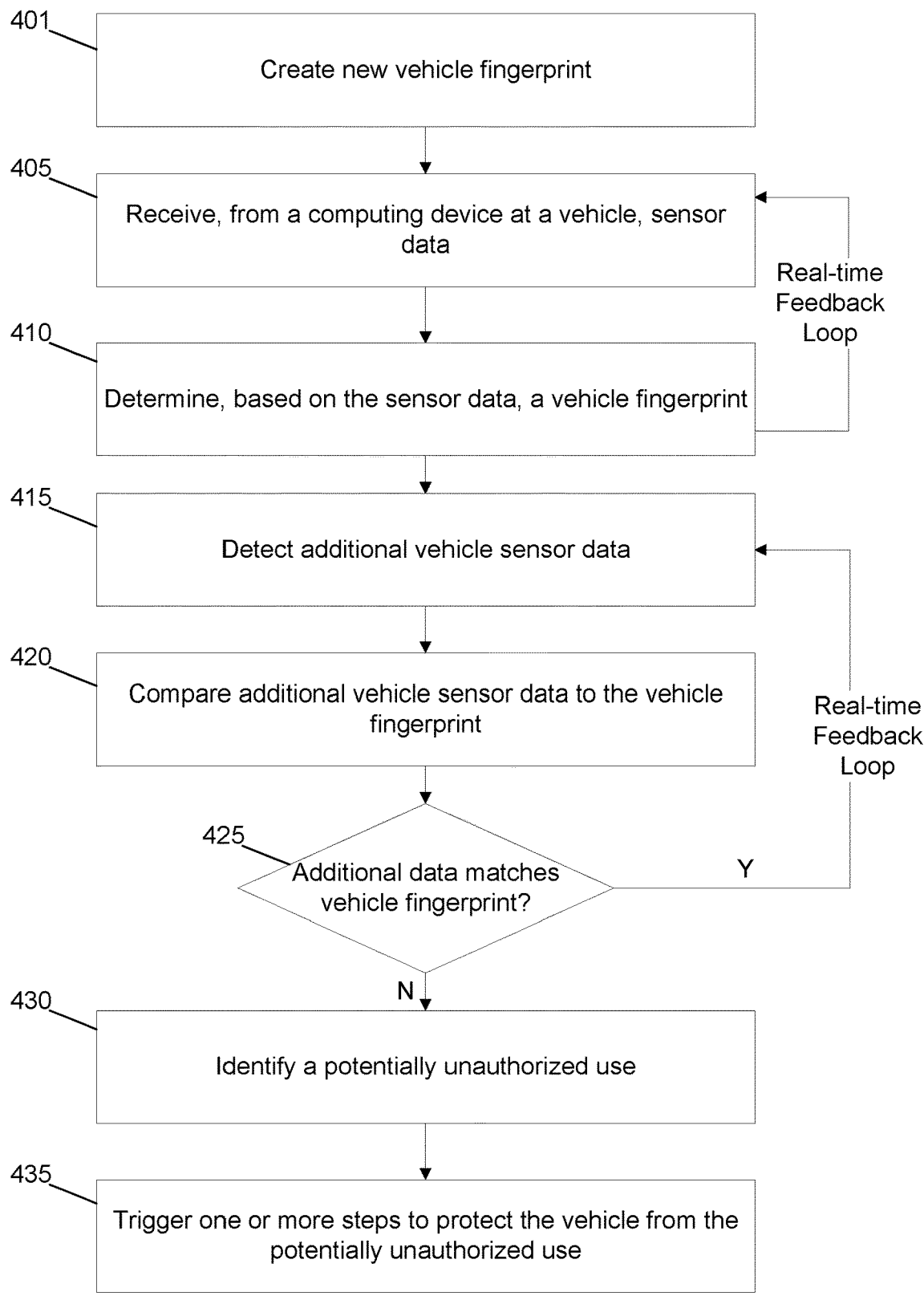
FIG. 4 illustrates an exemplary flowchart for determining a vehicle fingerprint and assessing a potential authorized use or other vehicle issue by comparing vehicle data to the vehicle fingerprint in accordance with one or more aspects described herein.

FIG. 4 illustrates an exemplary method of computing and using a vehicle fingerprint for the detection of unauthorized uses or other issues associated with the vehicle in accordance with one or more aspects described herein. For example, vehicle fingerprint determination engine 333 may analyze vehicle data to determine a vehicle fingerprint, based on, e.g., analysis of the vehicle data at various operating conditions such as when the vehicle is idling, when the vehicle is turning right or left, when the vehicle is moving at a certain rate of speed, and the like. Based on such determinations, vehicle fingerprint determination engine 333, in conjunction with driving pattern engine 335, may use vehicle data received over a period of time to determine a typical driving pattern over a determined range of time. For example, upon determining a vehicle fingerprint associated with each of a series of operating conditions, vehicle fingerprint determination engine 333, in conjunction with driving pattern engine 335, may then be configured to determine an operating condition associated with a component of vehicle data and then determine a series of operating conditions of the vehicle over a range of time to determine a typical driving pattern of the vehicle. Accordingly, driving pattern engine 335 may associate a driving pattern of the vehicle with the determined range of time. In some embodiments, the driving pattern may be associated with only certain period of time, e.g., weekdays, or mornings.

As another example, upon identifying a potentially unauthorized use, unauthorized use determination engine 338 may communicate this to user notification engine 340, which may provide, to a third party, the detected potentially unauthorized use as a verification service for uses, such as, for example, gig usages. For example, a third party, such as an insurance provider, may access a list of unauthorized uses associated with a vehicle or a customer. Accordingly, if an insurance claim is submitted on behalf of the customer, and/or other account related activity based on an occurrence during the potentially unauthorized use, the insurance provider may automatically classify the potentially unauthorized activity as unauthorized, and initiate steps to mitigate the effects of the unauthorized use of the vehicle.

The steps that follow in FIG. 4 may be implemented by one or more of the components in FIGS. 1 through 3 and/or other components, including other computing devices. FIG. 4 illustrates an exemplary method for determining a vehicle fingerprint, and subsequently using that vehicle fingerprint to determine a potentially unauthorized use of the vehicle or other vehicle issue in accordance with one or more aspects described herein. In that regard, and as described above for FIGS. 1 through 3, the system may include at least one sensor configured to measure a characteristic of a vehicle during a plurality of modes of operation, at least one processor, a communication interface communicatively coupled to the at least one processor, and memory storing computer-readable instructions that, when executed by the processor, cause the system to perform a number of step, such as those shown in FIG. 4.

An initial vehicle fingerprint setup occurs at step 401. In some instances, the initial setup may include a display of a setup user interface, in which a user device may display a graphical user interface similar to graphical user interface 610, which is shown in FIG. 6. For example, the user device may display a user interface that notifies the user that no vehicle fingerprints are currently detected for a given vehicle, and then provide the user with the option to create a vehicle fingerprint. In that regard, an initial fingerprint may be determined by an active setup, e.g., by specifying a range of operating conditions at specified time in which to operate the vehicle, or by a passive setup, e.g., by analyzing data as the vehicle is used in normal operation. Accordingly, by displaying the setup interface, the user is aware that vehicle fingerprint determination system 201 is operating and the user may be given access to review various data associated with the vehicle fingerprint and the vehicle fingerprint setup process as data is received and analyzed.

Referring again to FIG. 4, sensor data associated with the vehicle is initially received from at least one sensor during operation of the vehicle over one or more modes of operation at step 405. In some examples, these one or more modes of operation may include a plurality of trips by the vehicle and/or a plurality of drivers driving the vehicle. In some examples, the one or more modes of operation may include a set of vehicle maneuvers, such as a left turn, a right turn, a slow to a stop, an idle state, and the like. In some examples, the plurality of modes of operation may include an observation period to initially determine the vehicle fingerprint and an evaluation period to evaluate the vehicle fingerprint. Step 405 may include the retrieval of geo-location data, data indicative of whether a mobile computing device is in possession of a driver or a passenger of the vehicle, speed of the vehicle, acceleration data associated with the vehicle, and biometric data associated with the driver or the passenger. Sensor data received at step 405 may be part of an active setup or a passive setup, as described in more detail below.

At step 410, a vehicle fingerprint is determined or generated based on the received sensor data. In some examples, determining the vehicle fingerprint may include identifying portions of the sensor data associated with each of the plurality of modes of operation and determining vehicle characteristics associated with each mode of operation. In some examples, the vehicle fingerprint includes a frequency of the vehicle at the plurality of operating conditions, such as a frequency of the vehicle while idling, frequency of the vehicle in motion, and the like. In some examples, the vehicle fingerprint may include another characteristic of the vehicle that varies with the plurality of operating conditions. In some examples, the vehicle fingerprint may include variations with time, e.g., based on a driving pattern of the vehicle. Additional and/or alternative variations with time period may be associated with the vehicle fingerprint, such as, for example, a day of the week, a date, a month, and so forth.

In some embodiments, vehicle fingerprint determination system 201 may continue to receive additional vehicle data until a sufficient amount of data is received for an initial vehicle fingerprint or to determine an updated vehicle fingerprint. In some embodiments, vehicle fingerprint determination system 201 may continue to retrieve vehicle data in real time to determine one or more aspects of the vehicle fingerprint. For example, vehicle fingerprint determination system 201 may determine when a trip begins, a duration of the trip, and may retrieve driving data in real-time, and/or during repeated intervals of time, until a determination is made that the trip has stopped.

Once a vehicle fingerprint is determined, additional sensor data from the at least one sensor may be detected or received during additional operation of the vehicle at step 415. At step 420, the additional sensor data may be compared to the vehicle fingerprint. In some examples, the comparing may include comparing a drive profile (speed of the vehicle over a range of time) of the additional received sensor data with a drive profile of the vehicle fingerprint. In some examples, the comparing may include comparing relative rates of acceleration and/or frequency and duration of stops from the additional received sensor data with that of the vehicle fingerprint. The comparing may include comparing geo-location data of the additional received sensor data with geo-location data of the vehicle fingerprint. In some examples, the comparing may be specific to a time of day, such that, e.g., the additional received sensor data is compared to a component of the vehicle fingerprint associated with the same time of day as that of the additional received sensor data. Still in other examples, various other characteristics of the vehicle obtained from the additional received sensor data may be compared with corresponding characteristics of the vehicle fingerprint at step 420. In some examples, the comparing may include determining a type of use of the vehicle associated with the received additional sensor data.

A determination of whether a deviation (also referred to herein as an anomaly, an abnormality, or a deviation above a requisite threshold deviation) exists is made at step 425 based on comparing the received additional sensor data to the vehicle fingerprint. Based on determining there is no deviation or that any deviation in below a requisite threshold deviation, the system may continue to operate and may repeat steps 415, 420, and 425 as additional sensor data continues to be received. In some examples, a driving pattern of the vehicle for an interval of time may also be determined at step 410, and determining whether deviation exists at step 425 may include comparing at least one additional aspect of the additional sensor data to the driving pattern. The driving pattern may be based on how the vehicle is used over time, where the vehicle travels over time, driving behavior for the vehicle, and the like to determine a pattern in driving behavior. The driving pattern of the vehicle may include at least one of: a profile of speed of the vehicle over the interval of time, an average number of trips per day, an average number of drivers per day, an average number of vehicle passengers per day, an expected route of the vehicle per day or per week, an average number or stops along a route, an average speed(s) along a route, and an average driving time per day. Such patterns may be sensed and learned over time and/or may be updated as driving data of the vehicle changes over time.

In some embodiments, vehicle fingerprint determination system 201 may return to step 415 to continue detecting additional vehicle sensor data for the same vehicle. In some embodiments, vehicle fingerprint determination system 201 may, based on another comparing and upon another determination of a vehicle fingerprint of the vehicle, identify another deviation the vehicle fingerprint. Such steps may be performed in real-time, thereby triggering mitigation activities in real-time as well.

Based on determining there is a deviation or that a deviation is above a requisite threshold deviation (step 425: No), a potentially unauthorized activity may be identified at step 430. Some examples of potentially unauthorized activities may include an unauthorized driver, a driver under the influence, abnormal vehicle behavior, abnormal vehicle usage, abnormal driving patterns or pathways, locational anomalies, abnormal garaging of the vehicle, a ride share use, a vehicle share use, a parcel delivery use, a gig use or a non-gig use of the vehicle, and the like. At step 430, vehicle fingerprint determination system 201 may detect an account associated with the vehicle or with the driver. For example, vehicle fingerprint determination system 201 may receive information (e.g., from an enterprise server) for an account associated with the vehicle or with the driver of the vehicle and related authorized or unauthorized uses of the vehicle.

At step 430, vehicle fingerprint determination system 201 may identify a potentially unauthorized use based upon a determination that the additional data does not match a driving pattern associated with the vehicle fingerprint, e.g., if a deviation exceed a threshold. For example, vehicle fingerprint determination system 201 may determine a deviation from a vehicle fingerprint that occurred for about 10 minutes, starting at 9:00 A.M. Accordingly, vehicle fingerprint determination system 201 may determine that vehicle data during this time range deviates from a driving pattern of the vehicle at this time. Accordingly, vehicle fingerprint determination system 201 may identify this portion of vehicle data as a potentially unauthorized use of the vehicle.

For example, the vehicle fingerprint determination system 201 may determine that a potentially unauthorized use of the vehicle occurred for about 5 minutes, starting at 10:00 P.M. In such an instance, the vehicle fingerprint determination system 201 may access an enterprise server one or more types of unauthorized uses associated with the vehicle, and identify one of the one or more types of unauthorized uses associated with the detected potentially unauthorized use of the vehicle that started at 10:00 PM. If the enterprise server has no such data, the vehicle fingerprint determination system 201 may simply proceed to step 435 without further identifying a specific type of unauthorized use associated with the detected potentially unauthorized use of the vehicle that started at 10:00 PM.

Subsequently, at step 435 one or more steps may be triggered to protect the vehicle from the potentially unauthorized activity. For example, such steps may include providing an alert to the communication interface indicating a potential unauthorized use of the vehicle. In some instances, in displaying the alert to the communication interface, the user device may display a graphical user interface similar to graphical user interface 710, which is shown in FIG. 7. For example, the user device may display the alert as well as one or more options for the user to select in response to the alert. In the example shown in FIG. 7, the one or more options may include a prompt to take action 720, a prompt to review data 730 (including the data that triggered the alert), and a prompt to dismiss 740, e.g., if the user is aware of the alerted use and wishes to allow such use. Additional or alternative prompts may be provided in graphical user interface 710 without departing from the scope of the present invention.

In some examples, user input at the communication interface may be received indicating a dismissal of the alert. In certain examples, upon dismissing the alert, the system may determine that the deviation was erroneously determined, and the vehicle fingerprint may subsequently be updated based on at least the additional sensor data that resulted in the deviation.

In some examples, the one or more steps to protect the vehicle may include transmitting an alert notification to a remote device associated with an insurance provider. In other examples, the one or more steps to protect the vehicle may include transmitting an alert to an interface of the vehicle and/or stopping current or ongoing operation of the vehicle.

In some examples, vehicle fingerprint determination system 201 may receive an input from a customer associated with the vehicle in advance of a use of the vehicle, where the input indicates a deviation from the vehicle fingerprint that is an authorized use, such as a new driver of the vehicle, a drive to a destination that differs from the driving pattern, a drive at a time of day that differs from the driving pattern, driving behavior that will differ with previously detected driving behavior of the driver, and the like. Upon receiving such input, vehicle fingerprint determination system 201 may omit proceeding to step 435 in the event that a potentially unauthorized use is detected during the drive.

At step 435, vehicle fingerprint determination system 201 may trigger, in response to the potentially unauthorized use, one or more steps to protect the vehicle from the potentially unauthorized use. For example, vehicle fingerprint determination system 201 may send an alert notification to a customer or other provider associated with an account of the vehicle. As another example, vehicle fingerprint determination system 201 may prevent further potentially unauthorized use by, for example, detecting the potentially unauthorized use in real-time, and denying further access to the vehicle or preventing the vehicle from being starting again until receiving a verification from an account associated with the vehicle. In some embodiments, vehicle fingerprint determination system 201 may provide, to a third party, the analyzed vehicle data to verify that the use of the vehicle was authorized. For example, vehicle fingerprint determination system 201 may compile a driving pattern associated with typical use of the vehicle over a recurring period of time, e.g., weekdays. Accordingly, vehicle fingerprint determination system 201 may provide the compiled driving patterns to third parties monitoring use of the vehicle. For example, a third party server that provides an insurance service to the vehicle may receive the compiled driving patterns associated with the vehicle, and utilize such a compiled vehicle pattern to detect fraudulent and/or unauthorized use of the vehicle.

In some embodiments, vehicle fingerprint determination system 201 may determine, based on vehicle data, a characteristic of the vehicle associated with typical vehicle operation (e.g., independent of a driver of the vehicle) and use such information for detecting when the vehicle is in need or service or maintenance. In such examples, vehicle fingerprint determination system 201 may collect vehicle data associated with a plurality of drivers of the vehicle and determine vehicle fingerprint components that do not vary by driver. For example, vehicle data may indicate that the vehicle exhibits a slight pull to the left when the vehicle drives in a straight direction. Vehicle fingerprint determination system 201 may then identify, based on the additional received vehicle data, when a deviation from this occurs, such as when the vehicle begins exhibiting a harsher pull to the left than previously detected. Accordingly, vehicle fingerprint determination system 201 may then provide an alert indicating that the vehicle may need to be serviced to correct the detected alignment issue. In some embodiments, vehicle fingerprint determination system 201 may determine a vehicle fingerprint associated with one driver of the vehicle, and may determine that additional received data indicates normal operation of the vehicle but that the vehicle is being driven by another driver. Based on such determinations, vehicle fingerprint determination system 201 may trigger the one or more steps to notify a customer associated with the vehicle of the potentially unauthorized use and/or to protect the vehicle from the potentially unauthorized use.

Figure 5:
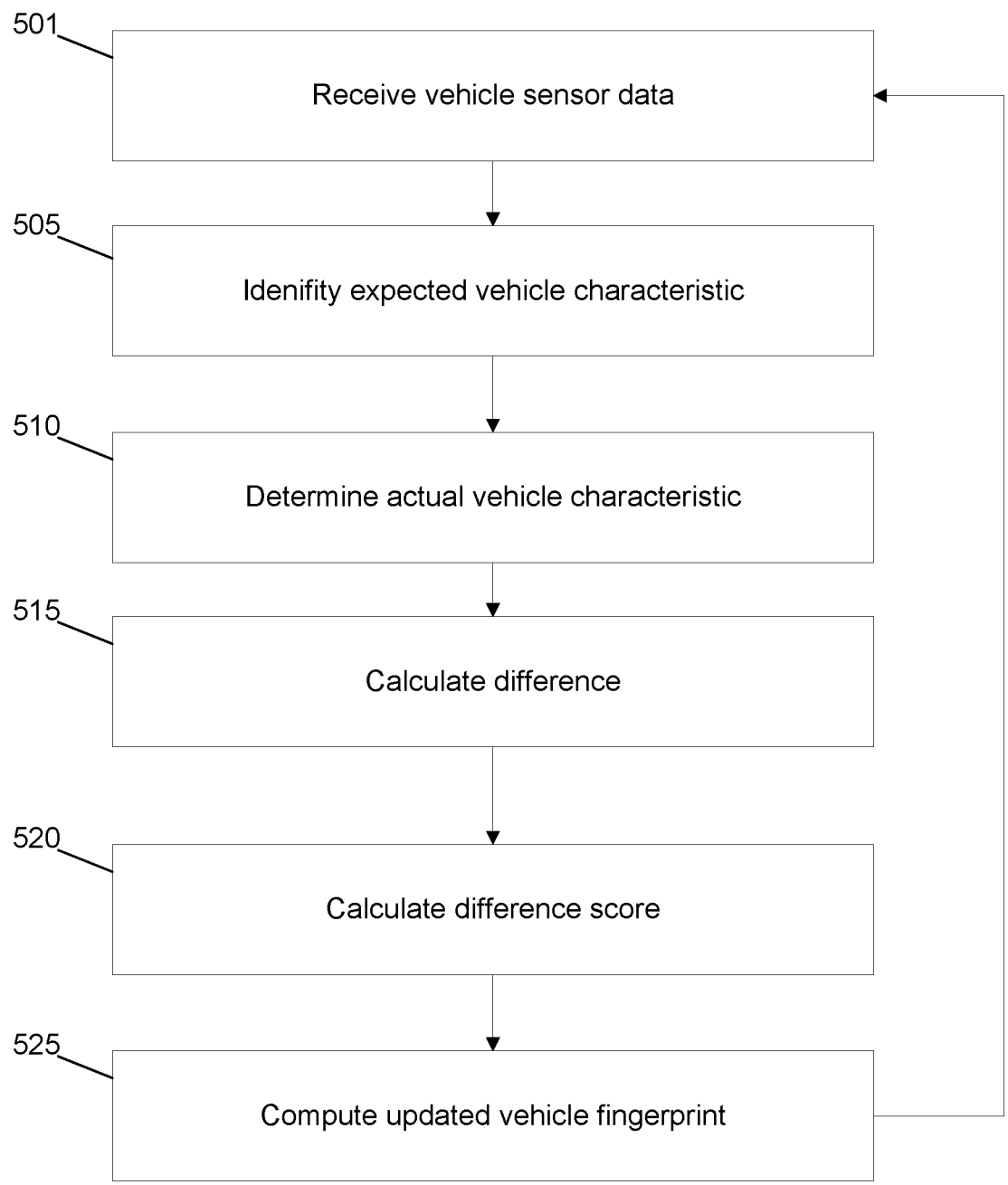
FIG. 5 illustrates an exemplary flowchart for applying a machine learning model to determine an updated vehicle fingerprint in accordance with one or more aspects described herein.

In some examples, methods may additionally include computing an updated vehicle fingerprint by applying a machine learning model to the vehicle fingerprint, based on the received additional sensor data, such as shown in FIG. 5. This may include receiving additional vehicle sensor data at step 501, identifying an expected characteristic of vehicle for a mode of operation at step 505 and determining an actual characteristic of the vehicle for the mode of operation based on received additional sensor data for the vehicle during the mode of operation at step 510. At step 515, a difference between the expected characteristic and the actual characteristic may be computed and, at step 520, a difference score may be computed based on the computed difference. At step 525, an updated vehicle fingerprint may be computed, based on the received additional sensor data and the computed difference score (e.g., a value between 0 and 1), by applying a machine learning model to the vehicle fingerprint. For example, a score of 0.1 may indicate a high difference between the expected characteristic and the actual characteristic, but a score of 0.9 may indicate a lesser difference. In some examples, difference scores may determine a weight to which additional received sensor data will update the vehicle fingerprint. Such a machine learning model may be dynamically updated based on feedback data of difference score. For example, if most difference scores are in the range of 0-0.2, the machine learning model may be too hard, and if most difference scores are in the range of 0.8-1, the machine learning model may be too lenient, and in either scenarios, the characteristics may be updated accordingly. In some examples, the vehicle fingerprint may be updated based on additional sensor data upon determining that an update interval for the vehicle fingerprint has passed.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. An apparatus implemented in a vehicle, the apparatus comprising:
   at least one sensor configured to measure a characteristic of the vehicle;
   at least one processor;
   a communication interface communicatively coupled to the at least one processor; and
   memory storing non-transitory computer-readable instructions that, when executed by the processor, cause the apparatus to:
   receive sensor data aggregated by the at least one sensor while the vehicle is being driven by a first driver in one or more plurality of modes of operation, wherein the sensor data indicates one or more of: a speed of the vehicle, a distance that the vehicle is driven, a rate of acceleration, a rate of braking of the vehicle, or a swerving of the vehicle;
   generate, based at least in part on the received sensor data, a first vehicle fingerprint indicative of driving characteristics associated with the first driver;
   after generating the first vehicle fingerprint, receive additional sensor data aggregated by the at least one sensor while the vehicle is being driven;
   identify an expected driving characteristic of the vehicle for a mode of operation of the one or more plurality of modes of operation;
   determine, based on the received additional sensor data, an actual driving characteristic of the vehicle for the mode of operation;
   compute a difference score indicating a difference between the expected driving characteristic and the actual driving characteristic;
   generate, based at least in part on the received additional sensor data and the computed difference score, a second vehicle fingerprint by applying a machine learning model to the first vehicle fingerprint; and
   after determining that a deviation exists between first vehicle fingerprint and the second vehicle fingerprint, providing an alert to the communication interface indicating a potential unauthorized use of the vehicle.

2. The apparatus of claim 1, wherein determining the first vehicle fingerprint includes identifying sensor data associated with each of the plurality of modes of operation and determining a vehicle characteristic associated with each mode of operation.

3. The apparatus of claim 1, wherein the plurality of modes of operation includes a plurality of trips and a plurality of drivers.

4. The apparatus of claim 1, wherein the first vehicle fingerprint includes a frequency of the vehicle at the plurality of modes of operation.

5. The apparatus of claim 1, wherein the memory stores additional non-transitory computer-readable instructions that, when executed by the at least one processor, further cause the apparatus to:
  receive a user input at the communication interface indicating a dismissal of the alert; and
  upon receiving the dismissal of the alert, determining an updated vehicle fingerprint based on at least the received additional sensor data.

6. The apparatus of claim 1, wherein the memory stores additional non-transitory computer-readable instructions that, when executed by the at least one processor, further cause the apparatus to:
  detect a driving pattern of the vehicle for an interval of time; and
  wherein determining whether a deviation exists includes comparing at least one additional aspect of the additional sensor data to the driving pattern.

7. The apparatus of claim 1, wherein the memory stores additional non-transitory computer-readable instructions that, when executed by the at least one processor, further cause the apparatus to:
  determine a type of use of the vehicle associated with the received additional sensor data.

8. A method comprising receiving, by a computing device, sensor data aggregated by a sensor system associated with a vehicle while the vehicle is being driven by a first driver in one or more plurality of modes of operation, wherein the sensor data indicates one or more of: a speed of the vehicle, a distance that the vehicle is driven, a rate of acceleration, a rate of braking of the vehicle, and swerving of the vehicle;
  generating, by the computing device and based at least in part on the received sensor data, a first vehicle fingerprint indicative of driving characteristics associated with the first driver;
  after generating the first vehicle fingerprint, receiving, by the computing device, additional sensor data aggregated by the sensor system while the vehicle is being driven;
  identify an expected driving characteristic of the vehicle for a mode of operation of the one or more plurality of modes of operation;
  determine, based on the received additional sensor data, an actual driving characteristic of the vehicle for the mode of operation;
  compute a difference score indicating a difference between the expected driving characteristic and the actual driving characteristic;
  generating, based at least in part on the received additional sensor data and the computed difference score, a second vehicle fingerprint by applying a machine learning model to the first vehicle fingerprint; and
  after determining that a deviation exists between first vehicle fingerprint and the second vehicle fingerprint, providing, by the computing device, an alert to a communication interface associated with the vehicle.

9. The method of claim 8, wherein receiving sensor data during operation of the vehicle over the plurality of modes of operation includes receiving sensor data associated with a plurality of trips and a plurality of drivers.

10. The method of claim 8, wherein determining the first vehicle fingerprint includes identifying sensor data associated with each of the plurality of modes of operation and determining a vehicle characteristic associated with each mode of operation.

11. The method of claim 8, further comprising:
receiving, by the computing device, a user input at the communication interface indicating a dismissal of the alert; and
upon receiving the dismissal of the alert, determining, by the computing device, an updated vehicle fingerprint based on at least the received additional sensor data.

12. The method of claim 8, further comprising:
detecting, by the computing device, a driving pattern of the vehicle for an interval of time; and
wherein determining whether a deviation exists includes comparing at least one additional aspect of the additional sensor data to the driving pattern.

13. The method of claim 8, further comprising:
determining, by the computing device, a type of use of the vehicle associated with the received additional sensor data.

14. A system comprising:
a first computing device associated with a vehicle, wherein the first computing device comprises:
  a processor;
  at least one sensor configured to measure a vehicle characteristic while the vehicle is being driven by a first driver;
  a wireless communication interface; and
  memory storing non-transitory instructions that, when executed by the processor, cause the first computing device to:
    measure, using the at least one sensor, vehicle operation data;
a second computing device in signal communication with the first computing device, wherein the second computing device comprises:
  a processor; and
  memory storing non-transitory instructions that, when executed by the processor, cause the second computing device to:
    receive, from the first computing device and for a plurality of modes of operation, vehicle operation data, wherein the vehicle operation data indicates one or more: of a speed of the vehicle, a distance that the vehicle is driven, a rate of acceleration, a rate of braking of the vehicle, or swerving of the vehicle, wherein the plurality of modes of operation occurs while the vehicle is driven;
    generate, based at least in part on the received vehicle operation data, a first vehicle fingerprint indicative of driving characteristics associated with the first driver;
    after generating the first vehicle fingerprint, receive additional vehicle operation data aggregated by the at least one sensor while the vehicle is being driven;
    identify an expected driving characteristic of the vehicle for a mode of operation of the plurality of modes of operation;
    determine, based on the received additional vehicle operation data, an actual driving characteristic of the vehicle for the mode of operation;
    compute a difference score indicating a difference between the expected driving characteristic and the actual driving characteristic;
    generate, based at least in part on the received additional vehicle operation data and the computed difference score, a second vehicle fingerprint by applying a machine learning model to the first vehicle fingerprint; and after determining that a deviation exists between first vehicle fingerprint and the second vehicle fingerprint, trigger one or more steps to protect the vehicle.

15. The system of claim 14, wherein the plurality of modes of operation includes a plurality of trips and a plurality of drivers.

16. The system of claim 14, wherein determining the first vehicle fingerprint includes identifying sensor data associated with each of the plurality of modes of operation and determining a vehicle characteristic associated with each mode of operation.

17. The system of claim 14, wherein the first vehicle fingerprint includes a frequency of the vehicle at the plurality of modes of operation.

18. The system of claim 14, wherein the first computing device comprises a mobile device and the second computing device comprises a server.

* * * * *